United States Patent
Xue et al.

(10) Patent No.: US 11,546,234 B2
(45) Date of Patent: Jan. 3, 2023

(54) NETWORK QUALITY DETERMINING METHOD AND APPARATUS AND STORAGE MEDIUM

(71) Applicant: Huawei Technologies Co., Ltd., Shenzhen (CN)

(72) Inventors: Li Xue, Nanjing (CN); Xiao Wei, Beijing (CN); Ming Yang, Beijing (CN); Xin Xiao, Nanjing (CN); Haonan Ye, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 28 days.

(21) Appl. No.: 16/864,565

(22) Filed: May 1, 2020

(65) Prior Publication Data

US 2020/0259723 A1     Aug. 13, 2020

Related U.S. Application Data

(63) Continuation of application No. PCT/CN2018/094300, filed on Jul. 3, 2018.

(30) Foreign Application Priority Data

Nov. 2, 2017    (CN) .......................... 201711067012.6

(51) Int. Cl.
*H04L 41/5067* (2022.01)
*H04L 41/5009* (2022.01)
(Continued)

(52) U.S. Cl.
CPC ...... *H04L 41/5067* (2013.01); *H04L 41/5009* (2013.01); *H04L 43/0817* (2013.01); *H04L 43/0829* (2013.01); *H04L 43/16* (2013.01)

(58) Field of Classification Search
CPC ............ H04L 41/5067; H04L 41/5009; H04L 43/0817; H04L 43/0829; H04L 43/16
(Continued)

(56) References Cited

U.S. PATENT DOCUMENTS 9,686,026 B1   6/2017   Reed et al.
2007/0192474 A1*   8/2007   Decasper ............ H04L 67/1078
                                                      709/223
(Continued)

FOREIGN PATENT DOCUMENTS

CN          1859227 A     11/2006
CN       102104900 A      6/2011
(Continued)

OTHER PUBLICATIONS

Minming, Q., "Research on IPTV Video Quality Monitoring System," with english abstract, Jan. 20, 2018, 1 page.
(Continued)

*Primary Examiner* — Meng Vang
(74) *Attorney, Agent, or Firm* — Conley Rose, P.C.

(57) ABSTRACT

A network quality determining method includes, when experience quality represented by a customer experience index of a target user within a first time period is lower than experience quality represented by a customer experience index threshold, determining, using a first parameter value that is of a network key performance indicator (KPI) parameter of the target user within a second time period and that is collected by a collection device in a carrier network, a second parameter value of the network KPI parameter of the target user within the second time period in a home network, and when network quality represented by the second parameter value of the network KPI parameter is lower than network quality represented by a first threshold correspond-
(Continued)

ing to the network KPI parameter in the home network, determining that quality of the home network is poor.

20 Claims, 5 Drawing Sheets

(51) Int. Cl.
*H04L 43/0817* (2022.01)
*H04L 43/0829* (2022.01)
*H04L 43/16* (2022.01)

(58) Field of Classification Search
USPC .......................................................... 370/252
See application file for complete search history.

(56) References Cited

U.S. PATENT DOCUMENTS

| | | | |
|---|---|---|---|
| 2012/0054785 A1 | 3/2012 | Yang et al. | |
| 2013/0091250 A1* | 4/2013 | Ko ........................... | H04L 67/12 709/219 |
| 2013/0294464 A1* | 11/2013 | Katsurai .................. | H03L 7/18 370/516 |
| 2014/0020004 A1 | 1/2014 | Hu et al. | |
| 2014/0052847 A1 | 2/2014 | Jadallah et al. | |
| 2014/0328206 A1* | 11/2014 | Chan .................. | H04L 43/0829 370/253 |
| 2014/0355439 A1* | 12/2014 | Kakadia .............. | H04L 41/5025 370/235 |
| 2015/0134419 A1* | 5/2015 | Kandasamy ..... | G06Q 10/06393 705/7.34 |
| 2015/0304196 A1 | 10/2015 | Sun et al. | |
| 2016/0103883 A1* | 4/2016 | Ramani .................. | G06Q 10/00 707/725 |
| 2016/0165461 A1* | 6/2016 | Kaul ...................... | H04W 24/02 370/217 |
| 2017/0215094 A1* | 7/2017 | Akoum ................. | H04W 24/08 |
| 2017/0290024 A1* | 10/2017 | Ouyang ................ | H04W 24/08 |
| 2019/0098043 A1* | 3/2019 | Banerjee ............. | H04L 63/1425 |
| 2019/0215250 A1* | 7/2019 | Bader ................. | H04L 41/5009 |

FOREIGN PATENT DOCUMENTS

| | | |
|---|---|---|
| CN | 102651821 A | 8/2012 |
| CN | 103731850 A | 4/2014 |
| CN | 105635722 A | 6/2016 |
| CN | 106850298 A | 6/2017 |
| EP | 2640006 A2 | 9/2013 |
| EP | 2784984 A1 | 10/2014 |
| EP | 3197198 A1 | 7/2017 |
| EP | 3127362 B1 | 10/2020 |
| JP | 2013121016 A | 6/2013 |
| JP | 5707309 B2 | 4/2015 |

OTHER PUBLICATIONS

Shan, L., "Investigation of IPTV Video Quality Monitoring System," Aug. 30, 2017, 5 pages.

Yanhua, N., "Research on QoS Monitoring Scheme for CATV Data Network," 2017, 5 pages.

* cited by examiner

NETWORK QUALITY DETERMINING METHOD AND APPARATUS AND STORAGE MEDIUM

CROSS-REFERENCE TO RELATED APPLICATIONS

This application is a continuation of International Patent Application No. PCT/CN2018/094300 filed on Jul. 3, 2018, which claims priority to Chinese Patent Application No. 201711067012.6 filed on Nov. 2, 2017. The disclosures of the aforementioned applications are hereby incorporated by reference in their entireties.

TECHNICAL FIELD

The present disclosure relates to the field of communications technologies, and in particular, to a network quality determining method and apparatus and a storage medium.

BACKGROUND

Currently, with development of network technologies, more users use network services, and more importance is attached to user experience in network services. A video service is used as an example. When user experience in the video service deteriorates, an operator needs to analyze network quality, and determine as soon as possible which part of a network causes the deterioration of user experience in the video service in order to resolve as soon as possible a problem of the deterioration of user experience in the video service. For a home network, an operator usually collects in real time network key performance indicator (KPI) parameters of users in the home network by deploying probes in terminals of all users in the entire network, and then analyzes quality of the home network of the users using the collected network KPI parameters.

However, due to a large quantity and various types of terminals of all the users in the entire network, the probes deployed by the operator are large in quantity and further need to be compatible with the various types of terminals in the network. Therefore, probe deployment has high costs and a long period, and it is difficult to deploy the probes in the terminals of all the users in the entire network. Consequently, quality of the home network cannot be accurately analyzed.

SUMMARY

This application provides a network quality determining method and apparatus and a storage medium, to resolve a problem that quality of a home network cannot be accurately analyzed because it is difficult to deploy a probe in a terminal of a user.

According to a first aspect, this application provides a network quality determining method, including when experience quality represented by a customer experience index of a target user within a first time period is lower than experience quality represented by a customer experience index threshold, determining, using a first parameter value that is of a network KPI parameter of the target user within a second time period and that is collected by a collection device in a carrier network, a second parameter value of the network KPI parameter of the target user within the second time period in a home network, where the customer experience index is used to represent service experience quality of the target user, the network KPI parameter is used to represent network quality, and the second time period includes the first time period, comparing network quality represented by the second parameter value of the network KPI parameter with network quality represented by a first threshold corresponding to the network KPI parameter in the home network, and when the network quality represented by the second parameter value of the network KPI parameter is lower than the network quality represented by the first threshold, determining that network quality of the home network is poor.

In this application, when experience quality represented by a customer experience index of a network service quality parameter of the target user within the first time period is lower than the experience quality represented by the customer experience index threshold, the second parameter value of the network KPI parameter of the target user within the second time period in the home network may be determined using the first parameter value that is of the network KPI parameter of the target user within the second time period and that is collected by the collection device in the carrier network, and then whether the network quality of the home network is poor is determined by comparing the network quality represented by the second parameter value with the network quality represented by the first threshold. When users run services, data transmitted between the users and a service provider network all passes through the carrier network. Therefore, in this application, the collection device is deployed in the carrier network, and the collection device may directly collect the first parameter value from the carrier network such that the second parameter value in the home network can be determined. Therefore, probes do not need to be deployed on terminals of the users in the network, thereby avoiding a problem that a network causing user video experience deterioration cannot be determined because it is difficult to deploy a probe and network quality cannot be accurately analyzed.

With reference to the first aspect, in a first possible implementation of the first aspect, the determining, using a first parameter value that is of a network KPI parameter of the target user within a second time period and that is collected by a collection device in a carrier network, a second parameter value of the network KPI parameter of the target user within the second time period in a home network includes determining the second parameter value based on the first parameter value and a baseline threshold of the network KPI parameter, where the baseline threshold is used to represent network quality of a network between the collection device and a connection location between the carrier network and the home network, and the network quality represented by the baseline threshold is higher than network quality represented by a second threshold of the network KPI parameter in the carrier network.

With reference to the first aspect or the foregoing possible implementation, in a second possible implementation of the first aspect, before the determining a value obtained by subtracting the baseline threshold from the first parameter value as the second parameter value, the method further includes determining the baseline threshold based on third parameter values that are of network KPI parameters of a plurality of users within a preset time period and that are collected by the collection device, where the third parameter value of each of the plurality of users is a parameter value of the network KPI parameter in a network between user equipment used by the user and the collection device.

With reference to the first aspect or the foregoing possible implementations, in a third possible implementation of the first aspect, the determining the baseline threshold based on third parameter values that are of network KPI parameters of a plurality of users within a preset time period and that are collected by the collection device includes sorting the third parameter values in ascending order of the third parameter values, and determining a third parameter value that is at a preset location after the sorting as the baseline threshold, or determining a statistical value of a third parameter value that is before a preset location after the sorting as the baseline threshold, where the preset location is a location within top 50% in the sorting order of the third parameter values.

With reference to the first aspect or the foregoing possible implementations, in a fourth possible implementation of the first aspect, before the determining a value obtained by subtracting the baseline threshold from the first parameter value as the second parameter value, the method further includes determining, based on customer experience indexes of the plurality of users within the preset time period and fourth parameter values of the network KPI parameters of the plurality of users within the preset time period in the home network, a mapping relationship between user experience parameters corresponding to the customer experience indexes and the network KPI parameters, where the user experience parameter is used to represent user service experience quality, and determining, based on the mapping relationship, the first threshold corresponding to the network KPI parameter in the home network.

With reference to the first aspect or the foregoing possible implementations, in a fifth possible implementation of the first aspect, the determining, based on customer experience indexes of the plurality of users within the preset time period and fourth parameter values of the network KPI parameters of the plurality of users within the preset time period in the home network, a mapping relationship between user experience parameters corresponding to the customer experience indexes and the network KPI parameters includes dividing the fourth parameter value into at least two network KPI parameter intervals, calculating, based on the customer experience index corresponding to the fourth parameter value of each of the at least two network KPI parameter intervals, a user experience parameter corresponding to the network KPI parameter interval, and for any network KPI parameter interval, determining a mapping relationship between a user experience parameter corresponding to the network KPI parameter interval and a target value of the network KPI parameter interval, where the target value of the network KPI parameter interval is greater than or equal to a left boundary of the network KPI parameter interval and is less than or equal to a right boundary of the network KPI parameter interval.

With reference to the first aspect or the foregoing possible implementations, in a sixth possible implementation of the first aspect, the determining, based on the mapping relationship, the first threshold corresponding to the network KPI parameter in the home network includes determining an inflection point of the network KPI parameter as the first threshold based on the mapping relationship, where a parameter value changing trend between a user experience parameter corresponding to the inflection point and a maximum value in the user experience parameter is different from a parameter value changing trend between the user experience parameter corresponding to the inflection point and a minimum value in the user experience parameter, or determining a parameter value of the network KPI parameter corresponding to a preset threshold of the user experience parameter based on the mapping relationship, where the preset threshold is a value of the user experience parameter when user experience quality represented by the user experience parameter meets a user requirement, and determining the parameter value of the network KPI parameter corresponding to the preset threshold as the first threshold.

With reference to the first aspect or the foregoing possible implementations, in a seventh possible implementation of the first aspect, before the determining, based on customer experience indexes of the plurality of users within the preset time period and fourth parameter values of the network KPI parameters of the plurality of users within the preset time period in the home network, a mapping relationship between user experience parameters corresponding to the customer experience indexes and the network KPI parameters, the method further includes determining a value obtained by subtracting the baseline threshold from the third parameter value of each of the plurality of users as the fourth parameter value of the user.

With reference to the first aspect or the foregoing possible implementations, in an eighth possible implementation of the first aspect, when the customer experience index is a video mean opinion score (VMOS), the user experience parameter is a VMOS.

With reference to the first aspect or the foregoing possible implementations, in a ninth possible implementation of the first aspect, when the customer experience index is a video stalling time ratio, the user experience parameter is a video stalling time ratio or a video stalling user quantity ratio.

With reference to the first aspect or the foregoing possible implementations, in a tenth possible implementation of the first aspect, the first parameter value includes parameter values of a plurality of sampling periods within the second time period, the determined second parameter value is a statistical value of differences between parameter values included in the first parameter value and the baseline threshold, and the comparing network quality represented by the second parameter value of the network KPI parameter with network quality represented by a first threshold corresponding to the network KPI parameter in the home network includes comparing the network quality represented by the second parameter value with the network quality represented by the first threshold by comparing the second parameter value of the network KPI parameter with the first threshold, or the determined second parameter value includes a plurality of parameter values, and each parameter value included in the second parameter value is a difference between each parameter value included in the first parameter value and the baseline threshold, and the comparing network quality represented by the second parameter value of the network KPI parameter with network quality represented by a first threshold corresponding to the network KPI parameter in the home network includes comparing the network quality represented by the second parameter value with the network quality represented by the first threshold by comparing a quantity of times for which network quality represented by parameter values in the second parameter value within the second time period is lower than the network quality represented by the first threshold with a preset standard quantity of times.

With reference to the first aspect or the foregoing possible implementations, in an eleventh possible implementation of the first aspect, the statistical value of the differences between the parameter values included in the first parameter value and the baseline threshold includes an average value of the differences between the parameter values included in the first parameter value and the baseline threshold, an upper edge value of a boxplot corresponding to the differences between the parameter values included in the first parameter value and the baseline threshold, or a value of a preset quantile corresponding to the differences between the parameter values included in the first parameter value and the baseline threshold.

With reference to the first aspect or the foregoing possible implementations, in a twelfth possible implementation of the first aspect, the customer experience index includes the video stalling time ratio and/or the VMOS, and the network KPI parameter includes a network latency and/or a network packet loss rate.

With reference to the first aspect or the foregoing possible implementations, in a thirteenth possible implementation of the first aspect, the plurality of users belong to a carrier network in which the target user is located or belongs to an optical line terminal (OLT) to which the target user belongs.

With reference to the first aspect or the foregoing possible implementations, in a fourteenth possible implementation of the first aspect, the collection device is disposed on a core router of the carrier network, or the collection device is deployed on a core router of the carrier network in bypass mode.

With reference to the first aspect or the foregoing possible implementations, in a fifteenth possible implementation of the first aspect, the second time period further includes a third time period before the first time period.

According to a second aspect, this application provides a network quality determining apparatus, including a determining unit configured to when experience quality represented by a customer experience index of a target user within a first time period is lower than experience quality represented by a customer experience index threshold, determine, using a first parameter value that is of a network KPI parameter of the target user within a second time period and that is collected by a collection device in a carrier network, a second parameter value of the network KPI parameter of the target user within the second time period in a home network, where the customer experience index is used to represent service experience of the target user, the network KPI parameter is used to represent network quality, and the second time period includes the first time period, and a comparison unit configured to compare network quality represented by the second parameter value of the network KPI parameter with network quality represented by a first threshold corresponding to the network KPI parameter in the home network, where the determining unit is further configured to when the network quality represented by the second parameter value of the network KPI parameter is lower than the network quality represented by the first threshold, determine that network quality of the home network is poor.

With reference to the second aspect, in a first possible implementation of the second aspect, when determining, using the first parameter value that is of the KPI parameter of the target user within the second time period and that is collected by the collection device in the carrier network, the second parameter value of the network KPI parameter of the target user within the second time period in the home network, the determining unit is further configured to determine the second parameter value based on the first parameter value and a baseline threshold of the network KPI parameter, where the baseline threshold is used to represent network quality of a network between the collection device and a connection location between the carrier network and the home network, and the network quality represented by the baseline threshold is higher than network quality represented by a second threshold of the network KPI parameter in the carrier network.

With reference to the second aspect or the foregoing possible implementation, in a second possible implementation of the second aspect, the determining unit is further configured to determine the baseline threshold based on third parameter values that are of network KPI parameters of a plurality of users within a preset time period and that are collected by the collection device, where the third parameter value of each of the plurality of users is a parameter value of the network KPI parameter in a network between user equipment used by the user and the collection device.

With reference to the second aspect or the foregoing possible implementations, in a third possible implementation of the second aspect, when determining the baseline threshold based on the third parameter values that are of the network KPI parameters of the plurality of users within the preset time period and that are collected by the collection device, the determining unit is further configured to sort the third parameter values in ascending order of the third parameter values, and determine a third parameter value that is at a preset location after the sorting as the baseline threshold, or determine a statistical value of a third parameter value that is before a preset location after the sorting as the baseline threshold, where the preset location is a location within top 50% in the sorting order of the third parameter values.

With reference to the second aspect or the foregoing possible implementations, in a fourth possible implementation of the second aspect, the determining unit is further configured to determine, based on customer experience indexes of the plurality of users within the preset time period and fourth parameter values of the network KPI parameters of the plurality of users within the preset time period in the home network, a mapping relationship between user experience parameters corresponding to the customer experience indexes and the network KPI parameters, where the user experience parameter is used to represent user service experience quality, and determine, based on the mapping relationship, the first threshold corresponding to the network KPI parameter in the home network.

With reference to the second aspect or the foregoing possible implementations, in a fifth possible implementation of the second aspect, when determining, based on the customer experience indexes of the plurality of users within the preset time period and the fourth parameter values of the network KPI parameters of the plurality of users within the preset time period in the home network, the mapping relationship between the user experience parameters corresponding to the customer experience indexes and the network KPI parameters, the determining unit is further configured to divide the fourth parameter value into at least two network KPI parameter intervals, calculate, based on the customer experience index corresponding to the fourth parameter value of each of the at least two network KPI parameter intervals, a user experience parameter corresponding to the network KPI parameter interval, and for any network KPI parameter interval, determine a mapping relationship between a user experience parameter corresponding to the network KPI parameter interval and a target value of the network KPI parameter interval, where the target value of the network KPI parameter interval is greater than or equal to a left boundary of the network KPI parameter interval and is less than or equal to a right boundary of the network KPI parameter interval.

With reference to the second aspect or the foregoing possible implementations, in a sixth possible implementation of the second aspect, when determining, based on the mapping relationship, the first threshold corresponding to the network KPI parameter in the home network, the determining unit is further configured to determine an inflection point of the network KPI parameter as the first threshold based on the mapping relationship, where a parameter value changing trend between a user experience parameter corresponding to the inflection point and a maximum value in the user experience parameter is different from a parameter value changing trend between the user experience parameter corresponding to the inflection point and a minimum value in the user experience parameter, or determine a parameter value of the network KPI parameter corresponding to a preset threshold of the user experience parameter based on the mapping relationship, where the preset threshold is a value of the user experience parameter when user experience quality represented by the user experience parameter meets a user requirement, and determine the parameter value of the network KPI parameter corresponding to the preset threshold as the first threshold.

With reference to the second aspect or the foregoing possible implementations, in a seventh possible implementation of the second aspect, the determining unit is further configured to determine a value obtained by subtracting the baseline threshold from the third parameter value of each of the plurality of users as the fourth parameter value of the user.

With reference to the second aspect or the foregoing possible implementations, in an eighth possible implementation of the second aspect, when the customer experience index is a VMOS, the user experience parameter is a VMOS.

With reference to the second aspect or the foregoing possible implementations, in a ninth possible implementation of the second aspect, when the customer experience index is a video stalling time ratio, the user experience parameter is a video stalling time ratio or a video stalling user quantity ratio.

With reference to the second aspect or the foregoing possible implementations, in a tenth possible implementation of the second aspect, the first parameter value includes parameter values of a plurality of sampling periods within the second time period, the determined second parameter value is a statistical value of differences between parameter values included in the first parameter value and the baseline threshold, and the comparison unit is further configured to compare the network quality represented by the second parameter value with the network quality represented by the first threshold by comparing the second parameter value of the network KPI parameter with the first threshold, or the determined second parameter value includes a plurality of parameter values, and each parameter value included in the second parameter value is a difference between each parameter value included in the first parameter value and the baseline threshold, and the comparison unit is further configured to compare the network quality represented by the second parameter value with the network quality represented by the first threshold by comparing a quantity of times for which network quality represented by parameter values in the second parameter value within the second time period is lower than the network quality represented by the first threshold with a preset standard quantity of times.

With reference to the second aspect or the foregoing possible implementations, in an eleventh possible implementation of the second aspect, the statistical value of the differences between the parameter values included in the first parameter value and the baseline threshold includes an average value of the differences between the parameter values included in the first parameter value and the baseline threshold, an upper edge value of a boxplot corresponding to the differences between the parameter values included in the first parameter value and the baseline threshold, or a value of a preset quantile corresponding to the differences between the parameter values included in the first parameter value and the baseline threshold.

With reference to the second aspect or the foregoing possible implementations, in a twelfth possible implementation of the second aspect, the customer experience index includes the video stalling time ratio and/or the VMOS, and the network KPI parameter includes a network latency and/or a network packet loss rate.

With reference to the second aspect or the foregoing possible implementations, in a thirteenth possible implementation of the second aspect, the plurality of users belong to a carrier network in which the target user is located or belongs to an OLT to which the target user belongs.

With reference to the second aspect or the foregoing possible implementations, in a fourteenth possible implementation of the second aspect, the collection device is disposed on a core router of the carrier network, or the collection device is deployed on a core router of the carrier network in bypass mode.

With reference to the second aspect or the foregoing possible implementations, in a fifteenth possible implementation of the second aspect, the second time period further includes a third time period before the first time period.

According to a third aspect, an embodiment of the present disclosure provides a network quality determining device, including a memory, a processor, a communications interface, and a bus, where the memory, the processor, and the communications interface are connected to and communicate with one another using the bus, the memory is configured to store program code, and the processor runs a program corresponding to executable program code by reading the executable program code stored in the memory, to perform the method according to any one of the first aspect or the implementations of the first aspect.

According to a fourth aspect, an embodiment of the present disclosure provides a computer-readable storage medium, where the computer-readable storage medium stores an instruction, and when the instruction is run on a computer, the computer is enabled to perform the method according to any one of the first aspect or the implementations of the first aspect.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

To make the purpose, technical solutions, and advantages of the embodiments of the present disclosure clearer, the following clearly describes the technical solutions of the embodiments of the present disclosure with reference to the accompanying drawings in the embodiments of the present disclosure. In a case that no conflict occurs, the embodiments in the application and the features in the embodiments may be mutually combined.

Figure 1:
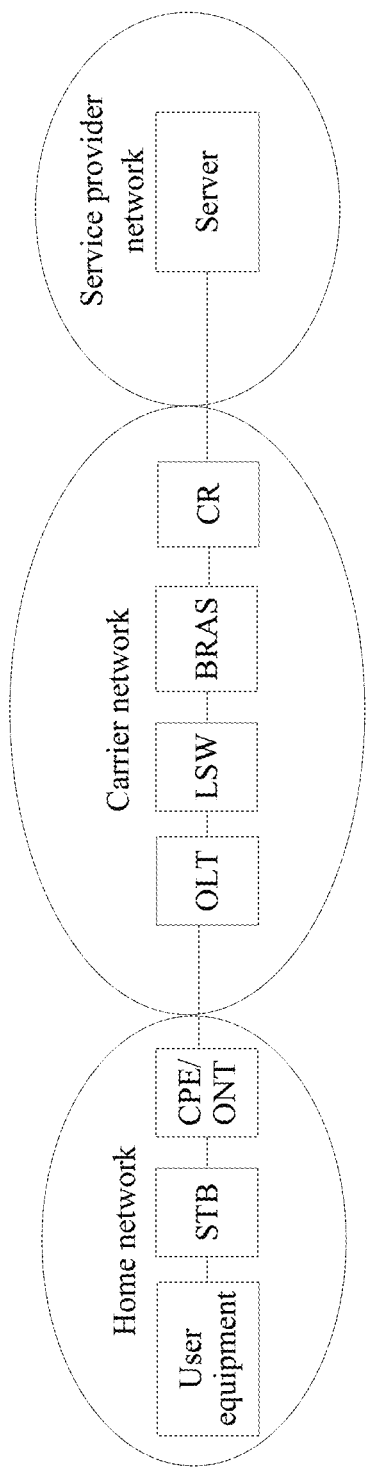
FIG. 1 is a schematic diagram of a network architecture according to an embodiment of the present disclosure.

The embodiments of the present disclosure may be applied to a network quality determining scenario. FIG. 1 is a schematic diagram of a network architecture used in an embodiment of the present disclosure. As shown in FIG. 1, a network between user equipment and a service providing server may be divided into three parts a service provider network, a carrier network, and a home network. The home network is a wired network and/or a wireless network disposed in a user family, and includes user equipment, a set top box (STB), customer premises equipment (CPE) or an optical network terminal (ONT), and the like. A user is connected to the carrier network using the home network, and is usually connected to an OLT device in the carrier network. The carrier network is separately connected to the home network and the service provider network. The carrier network includes various network devices, for example, an OLT, a switch (LSW), a broadband remote access server (BRAS), and a core router. A side providing a service for the user may be referred to as a service provider network, including a server providing a service for the user or the like, is connected to the carrier network, and provides a service for the user. Data between the user and the service providing server is transmitted using the carrier network. Therefore, in this embodiment of the present disclosure, to avoid a problem that quality of a home network cannot be accurately analyzed because it is difficult to deploy a probe in a terminal of each user in a network when user service experience quality deteriorates, a manner in which a collection point is set in the carrier network and a collection device collects, at the collection point, data used for analyzing the quality of the home network is used. Usually, the collection device may be disposed on a transmission device of the carrier network, or may be deployed on a transmission device in bypass mode. The transmission device may be a core router or a BRAS. Specifically, when disposed on the core router, the collection device may be disposed at a port, in the core router, that is used for communicating with the service provider network.

Figure 2:
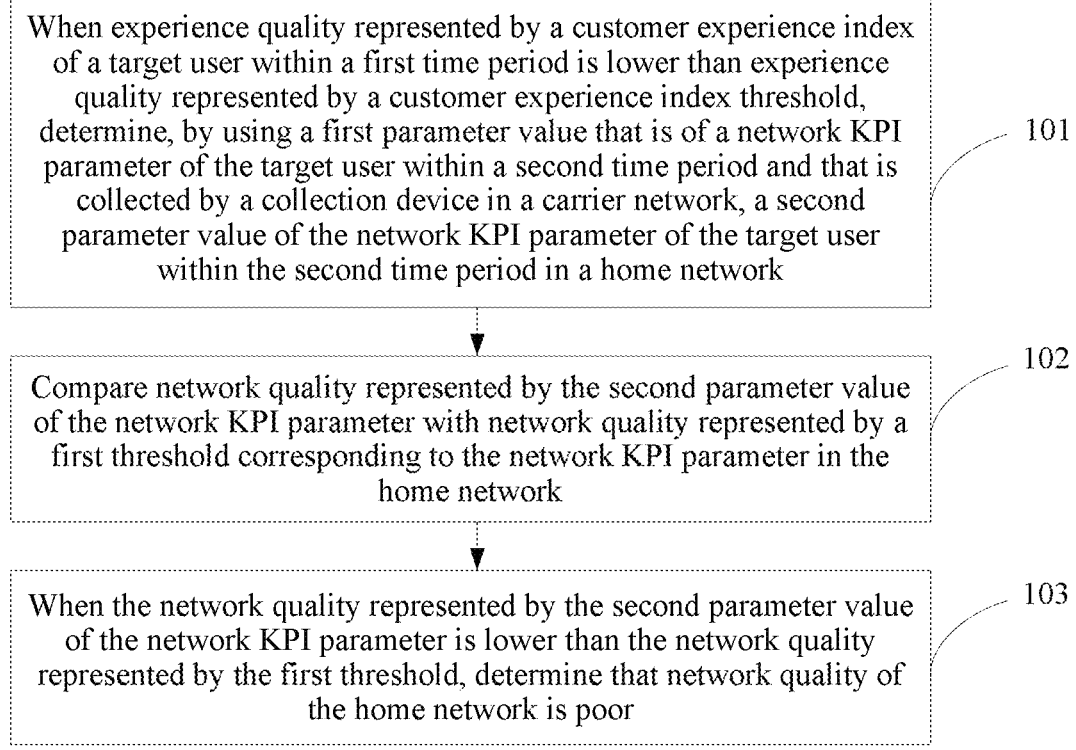
FIG. 2 is a schematic flowchart of a network quality determining method according to an embodiment of the present disclosure.

An embodiment of the present disclosure provides a network quality determining method that may be applied to a data analysis device. As shown in FIG. 2, the method includes the following steps.

101. When experience quality represented by a customer experience index of a target user within a first time period is lower than experience quality represented by a customer experience index threshold, determine, using a first parameter value that is of a network KPI parameter of the target user within a second time period and that is collected by a collection device in a carrier network, a second parameter value of the network KPI parameter of the target user within the second time period in a home network.

The customer experience index is used to represent user service experience quality, namely, network service quality of a user, and the network KPI parameter is used to represent network quality. If a larger customer experience index indicates poorer service experience quality of the target user, that the experience quality represented by the customer experience index is lower than the experience quality represented by the customer experience index threshold means that the customer experience index is greater than the customer experience index threshold. For example, when the customer experience index is a video stalling time ratio, the customer experience index threshold is a video stalling time ratio threshold, and a larger video stalling time ratio indicates poorer service experience quality of the target user, that the experience quality represented by the video stalling time ratio of the target user is lower than the experience quality represented by the customer experience index threshold may be further implemented as follows The video stalling time ratio of the target user is greater than the video stalling time ratio threshold. If a smaller customer experience index indicates poorer service experience quality of the target user, that the experience quality represented by the customer experience index is lower than the experience quality represented by the customer experience index threshold may be further implemented as follows The customer experience index is less than the customer experience index threshold. For example, when the customer experience index is a VMOS, the customer experience index threshold is a VMOS threshold, and a smaller VMOS indicates poorer service experience quality of the target user, that the experience quality represented by the VMOS of the target user is lower than the experience quality represented by the VMOS threshold may be further implemented as follows The VMOS of the target user is less than the VMOS threshold.

With reference to the network architecture shown in FIG. 1, in this embodiment of the present disclosure, the collection device is disposed in the carrier network. The customer experience index of the target user within the first time period may be obtained from the collection device, or may be calculated based on customer experience index data collected by the collection device.

The first time period may include a plurality of sampling periods. For example, if a length of the first time period is five minutes, and a length of each sampling period is one minute, the first time period includes five sampling periods with a length of one minute. The customer experience index of the target user within the first time period may be further calculated based on customer experience index data of a plurality of sampling periods within the first time period that is collected by the collection device. For example, the customer experience index data collected by the collection device is a VMOS or a stalling time ratio of each sampling period, and in this case, the calculated customer experience index may be an average value of VMOSs of a plurality of sampling periods or an average value of stalling time ratios of a plurality of sampling periods. For another example, the customer experience index data collected by the collection device is playing duration and stalling duration of each sampling period, and in this case, the calculated customer experience index may be a stalling time ratio (namely, a ratio of a sum of stalling duration to a sum of playing duration) within the first time period that is calculated based on the sum of the stalling duration and the sum of the playing duration of the sampling periods.

In this embodiment of the present disclosure, the second time period includes the first time period. When the experience quality represented by the customer experience index of the target user is lower than the experience quality represented by the customer experience index threshold, it indicates that network service quality of the user deteriorates, and in this case, the quality of the home network needs to be analyzed, to determine whether the home network is a network that causes the deterioration of the network service quality, in other words, whether the quality of the home network is poor. In this embodiment of the present disclosure, whether the quality of the home network is poor is determined by analyzing a network KPI parameter value of the home network. Therefore, when the experience quality represented by the customer experience index of the target user within the first time period is lower than the experience quality represented by the customer experience index threshold, a parameter value of the network KPI parameter, namely, the second parameter value of the network KPI parameter, of the target user within the first time period in the home network needs to be determined. In this case, the second time period is the first time period. With reference to the network architecture shown in FIG. 1, in this embodiment of the present disclosure, the collection device collects a parameter value, namely, the first parameter value, of the network KPI parameter of the target user within the first time period, and the second parameter value can be determined using the first parameter value collected by the collection device.

It should be noted that, usually, the quality of the home network becomes poorer before the deterioration of the network service quality of the user. Therefore, during analysis of the quality of the home network, to ensure accuracy of an analysis result, a network KPI parameter value of the home network within a time period of deterioration of the service quality of the user needs to be analyzed, and a network KPI parameter value of the home network before the time period of deterioration of the service quality of the user may further be analyzed. Therefore, in this embodiment of the present disclosure, the second time period may further include the first time period and a third time period before the first time period. The third time period and the first time period are usually continuous in time. In other words, the third time period and the first time period may constitute a continuous time period. A length of the third time period may be set based on a specific scenario. For example, the length of the third time period may be equal to the length of the first time period.

The network KPI parameter of the target user is a network KPI parameter existing when the target user accesses, using user equipment in the home network through the carrier network, a service provided by a provider network. The customer experience index of the target user is a customer experience index existing when the target user accesses, using the user equipment in the home network through the carrier network, the service provided by the provider network. For example, the network KPI parameter of the target user may be a network KPI parameter existing when the target user accesses an internet protocol television (IPTV) service using a STB, and the customer experience index of the target user may be a customer experience index existing when the target user accesses the IPTV service using the STB.

In this embodiment of the present disclosure, the customer experience index may include the video stalling time ratio, the VMOS, and/or the like, and the network KPI parameter may include a network latency, a network packet loss rate, and/or the like.

In an optional implementation of this embodiment of the present disclosure, a manner of determining, using a first parameter value that is of a network KPI parameter of the target user within a second time period and that is collected by a collection device in a carrier network, a second parameter value of the network KPI parameter of the target user within the second time period in a home network in step 101 may be further determine the second parameter value based on the first parameter value and a baseline threshold of the network KPI parameter, where the baseline threshold is used to represent network quality of a network between the collection device and a connection location between the carrier network and the home network, and the network quality represented by the baseline threshold is higher than network quality represented by a standard value of the network KPI parameter in the carrier network. It may be understood that, if the collection device is at the connection location between the carrier network and the service provider network, for example, the collection device is disposed on the core router of the carrier network or disposed on the core router of the carrier network in bypass mode, the network between the collection device and the connection location between the carrier network and the home network is the carrier network, and correspondingly, the baseline threshold is used to represent network quality of the carrier network.

The first parameter is a parameter value that is collected by the collection device and that is of the network KPI parameter of the target user in the network between the user equipment used by the target user and the collection device. The baseline threshold is used to represent the network quality of the network between the collection device and the connection location between the carrier network and the home network. In other words, the baseline threshold represents a network KPI parameter value under action of the network between the collection device and the connection location between the carrier network and the home network. The second parameter is a parameter value of the network KPI parameter of the target user in the home network. Therefore, the second parameter value can be obtained based on the first parameter and the baseline threshold.

The second threshold represents a network KPI parameter value existing when the network quality of the carrier network meets a user requirement. The second threshold may be preset, or the specified second threshold may be obtained based on experience, or may be provided by an operator. That the network quality represented by the baseline threshold is higher than the network quality represented by the second threshold indicates that the baseline threshold may represent network quality existing when a network status of the network between the collection device and the connection location between the carrier network and the home network is favorable.

102. Compare network quality represented by the second parameter value of the network KPI parameter with network quality represented by a first threshold corresponding to the network KPI parameter in the home network.

Different parameter values of the network KPI parameter correspond to different network quality. The network quality represented by the first threshold corresponding to the network KPI parameter in the home network may be used to measure the quality of the home network. After the second parameter value is determined in step 101, the network quality represented by the second parameter value of the network KPI parameter may be compared with the network quality represented by the first threshold corresponding to the network KPI parameter in the home network, to determine whether the quality of the home network is poor.

The first parameter value may include parameter values of a plurality of sampling periods within the second time period.

In an implementation, the second parameter value determined in step 101 is a statistical value of differences between parameter values included in the first parameter value and the baseline threshold. For example, a statistical value of the parameter values included in the first parameter value may be calculated first, and then the baseline threshold is subtracted from the statistical value of the parameter values included in the first parameter value to obtain the second parameter value, or the differences between the parameter values included in the first parameter value and the baseline threshold may be calculated first, and then the statistical value of the differences is used to obtain the second parameter value.

The statistical value of the differences between the parameter values included in the first parameter value and the baseline threshold, that is, the second parameter value, may further include an average value of the differences between the parameter values included in the first parameter value and the baseline threshold, an upper edge value of a boxplot corresponding to the differences between the parameter values included in the first parameter value and the baseline threshold, or a value of a preset quantile corresponding to the differences between the parameter values included in the first parameter value and the baseline threshold. The preset quantile may be specifically an upper quartile.

In the implementation, a specific execution manner of step 102 may be comparing the network quality represented by the second parameter value with the network quality represented by the first threshold by comparing the second parameter value of the network KPI parameter with the first threshold.

In this embodiment of the present disclosure, if a larger parameter value of the network KPI parameter indicates poorer network quality, when the second parameter value of the network KPI parameter is greater than the first threshold, it indicates that the network quality represented by the second parameter value is lower than the network quality represented by the first threshold, and when the second parameter value of the network KPI parameter is less than the first threshold, it indicates that the network quality represented by the second parameter value is higher than the network quality represented by the first threshold. If a smaller parameter value of the network KPI parameter indicates poorer network quality, when the second parameter value of the network KPI parameter is less than the first threshold, it indicates that the network quality represented by the second parameter value is lower than the network quality represented by the first threshold, and when the second parameter value of the network KPI parameter is greater than the first threshold, it indicates that the network quality represented by the second parameter value is higher than the network quality represented by the first threshold.

When a larger parameter value of the network KPI parameter indicates poorer network quality, the network KPI parameter may be a network packet loss rate, a network latency, or the like.

For example, the network KPI parameter is a network latency, and the customer experience index is a video stalling time ratio. If experience quality represented by the video stalling time ratio of the user within the first time period is lower than the experience quality represented by the customer experience index threshold, the second parameter value of the network latency of the target user within the second time period in the home network is determined by performing step 101, and then the second parameter value of the network latency is compared with the first threshold of the network latency in the home network, to compare the network quality represented by the second parameter value of the network latency with the network quality represented by the first threshold corresponding to the network latency in the home network. In this case, if the second parameter value of the network latency is greater than the first threshold corresponding to the network latency in the home network, it indicates that the network quality represented by the second parameter value of the network latency is lower than the network quality represented by the first threshold corresponding to the network latency in the home network. If the second parameter value of the network latency is less than the first threshold corresponding to the network latency in the home network, it indicates that the network quality represented by the second parameter value of the network latency is higher than the network quality represented by the first threshold corresponding to the network latency in the home network.

In another implementation, the second parameter value determined in step 101 includes a plurality of parameter values, and each parameter value included in the second parameter value is a difference between each parameter value included in the first parameter value and the baseline threshold. In this case, a specific execution manner of step 102 may be comparing the network quality represented by the second parameter value with the network quality represented by the first threshold by comparing a quantity of times for which network quality represented by parameter values within the second time period is lower than the network quality represented by the first threshold with a preset standard quantity of times.

If the quantity of times for which the network quality represented by the parameter values within the second time period is lower than the network quality represented by the first threshold is greater than the preset standard quantity of times, it may be determined that the network quality represented by the second parameter value is higher than the network quality represented by the first threshold. If the quantity of times for which the network quality represented by the parameter values within the second time period is lower than the network quality represented by the first threshold is less than the preset standard quantity of times, it may be determined that the network quality represented by the second parameter value is lower than the network quality represented by the first threshold.

The collection device may collect parameter values of a plurality of sampling periods (namely, a plurality of parameter values included in the first parameter value) within the second time period. In this case, the second parameter value determined in step 101 may include parameter values of the plurality of sampling periods corresponding to the network KPI parameter of the target user within the second time period in the home network. Therefore, whether the network quality represented by the parameter values in the second parameter value within the second time period is lower than the network quality represented by the first threshold may be determined, to determine the quantity of times for which the network quality represented by the second parameter value within the second time period is lower than the network quality represented by the first threshold.

Usually, a larger quantity of times for which the network quality represented by the parameter values in the second parameter value within the second time period is lower than the network quality represented by the first threshold indicates poorer network quality. Therefore, when a quantity of times for which network quality represented by a plurality of parameter values in the second parameter value within the second time period is lower than the network quality represented by the first threshold is greater than the preset standard quantity of times, it indicates that the network quality represented by the second parameter value is lower than the network quality represented by the first threshold. When the quantity of times for which the network quality represented by the parameter values in the second parameter value within the second time period is lower than the network quality represented by the first threshold is less than the preset standard quantity of times, it indicates that the network quality represented by the second parameter value is higher than the network quality represented by the first threshold.

For example, the network KPI parameter is a network latency, and the customer experience index is a video stalling time ratio. If a larger parameter value of the network latency indicates poorer network quality, after the second parameter value of the network latency of the target user within the second time period in the home network is determined by performing step 101, the parameter values included in the second parameter value may be compared with the first threshold of the network latency in the home network, to obtain a quantity of times for which the parameter values included in the second parameter value is greater than the first threshold, that is, a quantity of times for which the network quality represented by the parameter values in the second parameter value of the network latency within the second time period is lower than the network quality represented by the first threshold may be obtained. Then, the obtained quantity of times is compared with the preset standard quantity of times, to compare the network quality represented by the second parameter value of the network latency of the target user within the second time period in the home network with the network quality represented by the first threshold corresponding to the network latency in the home network. In this case, if the determined quantity of times is greater than the preset standard quantity of times, it indicates that the network quality represented by the second parameter value of the network latency of the target user within the second time period in the home network is lower than the network quality represented by the first threshold corresponding to the network latency in the home network. If the determined quantity of times is less than the preset standard quantity of times, it indicates that the network quality represented by the second parameter value of the network latency of the target user within the second time period in the home network is higher than the network quality represented by the first threshold corresponding to the network latency in the home network.

103. When the network quality represented by the second parameter value of the network KPI parameter is lower than the network quality represented by the first threshold, determine that network quality of the home network is poor.

It should be noted that, the network KPI parameter may be at least two parameters, for example, include a network packet loss rate and a network latency. In this case, once network quality represented by a second parameter value of one parameter is lower than the network quality represented by the corresponding first threshold, it may indicate that the quality of the home network is poor.

In this embodiment of the present disclosure, when experience quality represented by a customer experience index of a network service quality parameter of the target user within the first time period is lower than the experience quality represented by the customer experience index threshold, the second parameter value of the network KPI parameter of the target user within the second time period in the home network may be determined using the first parameter value that is of the network KPI parameter of the target user within the second time period and that is collected by the collection device in the carrier network, and then whether the network quality of the home network is poor is determined by comparing the network quality represented by the second parameter value with the network quality represented by the first threshold. When users run services, data transmitted between the users and the service provider network all passes through the carrier network. Therefore, in this embodiment of the present disclosure, the collection device is deployed in the carrier network, and the collection device may directly collect the first parameter value from the carrier network such that the second parameter value of the network KPI parameter in the home network can be determined. Therefore, probes do not need to be deployed on terminals of the users in the network, thereby avoiding a problem that a network causing user video experience deterioration cannot be determined because it is difficult to deploy a probe and network quality cannot be accurately analyzed.

The baseline threshold may be first determined before the second parameter value is determined based on the first parameter value and the baseline threshold of the network KPI parameter. A specific determining manner may be determining the baseline threshold based on third parameter values that are of network KPI parameters of a plurality of users within a preset time period and that are collected by the collection device, where the third parameter value of each of the plurality of users is a parameter value of the network KPI parameter in a network between user equipment used by the user and the collection device.

It should be noted that, the preset time period may include a plurality of sampling periods, and correspondingly, there may be a plurality of third parameter values of each user within the preset time period, and the third parameter values are parameter values of the plurality of sampling periods within the preset time period. Assuming that the plurality of users are 100 users, the preset time period includes 100 sampling periods, and the KPI parameter is a network latency, a baseline threshold corresponding to the network latency may be determined based on parameter values of 100*100 network latencies.

It can be learned from the network architecture shown in FIG. 1 that, when service data is transmitted to all users in a same network, conditions for the transmission in the carrier network are the same, and in this case, it may be considered that values of network KPI parameters of all the users in the same network in the carrier network are basically the same. In this embodiment of the present disclosure, the baseline threshold may be determined using third parameter values that are of network KPI parameters of a plurality of users within the preset time period and that are collected by the collection device, and the determined baseline threshold is used to represent a value of a network KPI parameter of each user in the network between the collection device and the connection location between the carrier network and the home network when a status of the network is favorable.

The plurality of users may belong to a carrier network in which the target user is located, or the plurality of users may belong to an OLT to which the target user belongs. Therefore, in this embodiment of the present disclosure, the baseline threshold determined using the third parameter values that are of the network KPI parameters of the plurality of users within the preset time period and that are collected by the collection device may be used as a network KPI parameter value of the target user in the network between the collection device and the connection location between the carrier network and the home network, and then the second parameter value may be determined using the first parameter and the baseline threshold. Usually, the target user may be one of the plurality of users, and when the plurality of users belong to the OLT to which the target user belongs, the plurality of users may be all users of the OLT to which the target user belongs.

The collection device usually may collect third parameter values using a plurality of sampling periods within the preset time period. Therefore, each user has a plurality of third parameter values, and the third parameter values are network KPI parameter values collected in different sampling periods within the preset time period.

In this embodiment of the present disclosure, a manner of determining the baseline threshold based on the third parameter values that are of the network KPI parameters of the plurality of users within the preset time period and that are collected by the collection device may further include sorting the third parameter values in ascending order of the third parameter values, and determining a third parameter value that is at a preset location after the sorting as the baseline threshold, or determining a statistical value of a third parameter value that is before a preset location after the sorting as the baseline threshold, where the preset location is a location within top 50% in the sorting order of the third parameter values.

For example, the network KPI parameter is a network latency. In collected third parameter values of network latencies, network latency values of most users are relatively small. Values of network KPI parameters of all users in a same network in the carrier network are almost the same. Therefore, when the third parameter values of the network latencies include a relatively small network latency value, it may indicate that a latency of the network between the collection device and the connection location between the carrier network and the home network is also relatively small. Therefore, in this embodiment of the present disclosure, after a distribution status of the third parameter values of the network latencies is determined, the baseline threshold of the network KPI parameter may be determined based on the distribution status.

Specifically, the third parameter values of the network latencies may be sorted first based on values of the third parameter values of the network latencies. For example, the third parameter values of the network latencies are sorted in ascending order of values of the network latencies, to obtain the distribution status of the third parameter values of the network latencies. A third parameter value that is of a network latency and that is at the preset location after the sorting is selected and determined as the baseline threshold of the network latency, or a statistical value of a third parameter value that is before the preset location after the sorting is determined as the baseline threshold.

The preset location may be a location within top 50% in the sorting order of the third parameter values. Specifically, the preset location may be a location at top 20% in the sorting order. The baseline threshold may be a third parameter value at the preset location, or may be a statistical value of a third parameter value that is before the preset location. The statistical value may be further an average value.

Figure 3:
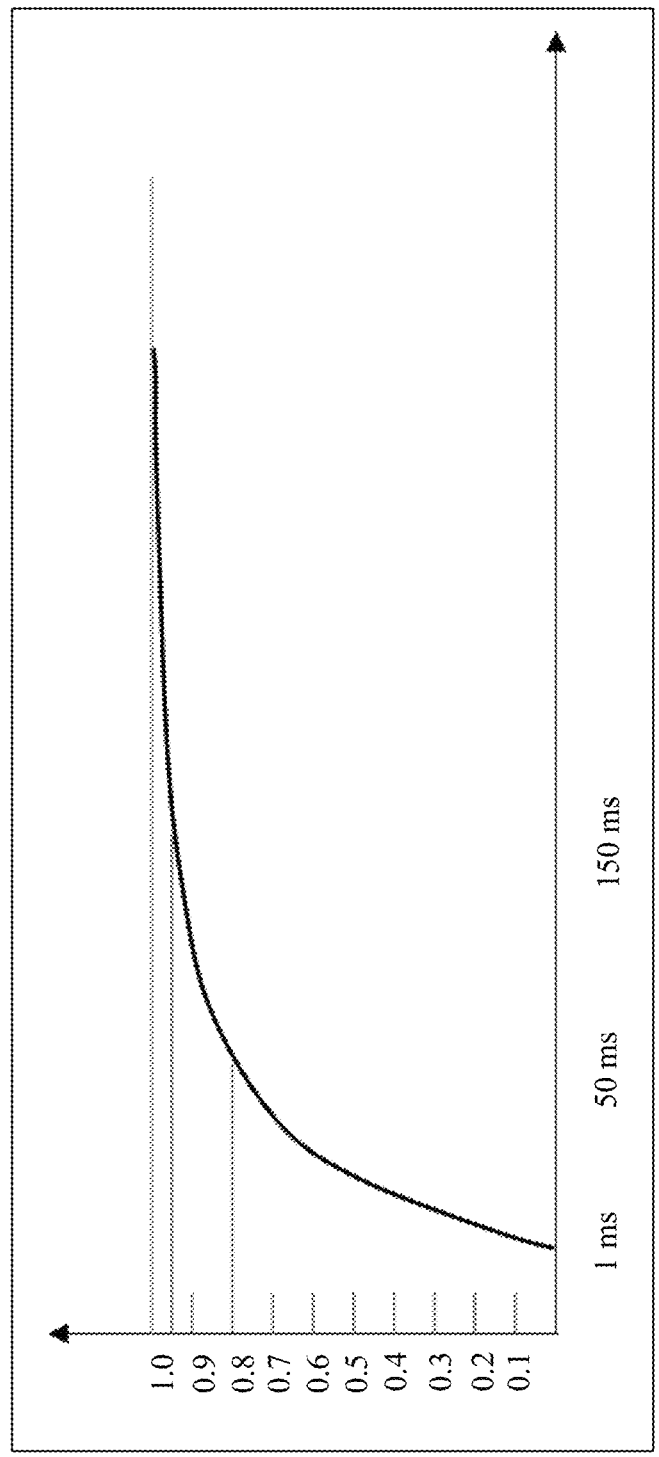
FIG. 3 is a schematic boxplot of third parameter values of network latencies corresponding to a plurality of users according to an embodiment of the present disclosure.

For example, FIG. 3 is a boxplot of third parameter values that are of network latencies corresponding to a plurality of users and that are collected by a collection device. As shown in FIG. 3, a horizontal coordinate represents a value of a network latency, and a vertical coordinate represents a value of cumulative distribution of third parameter values of network latencies. For example, when the vertical coordinate is 0.1, it indicates a third parameter value at a location of 10% in a sorting order after the third parameter values of the network latencies are sorting in ascending order. In this case, a horizontal coordinate value corresponding to the vertical coordinate 0.1 represents a specific value of the third parameter value of the network latency at the location of 10% in the sorting order. In this embodiment of the present disclosure, if a third parameter value at a preset location is a third parameter value at a location of 20% in the sorting order, the third parameter value at the preset location is a horizontal coordinate value corresponding to the vertical coordinate 0.2 in FIG. 3 such that a baseline threshold is obtained.

It should be noted that, when a network status of the carrier network is favorable, third parameter values of most user network latencies are distributed within a relatively small-value range. The users may access the carrier network wired or wirelessly using user equipment. When the users access the carrier network through a wired connection, data transmission thereof is relatively reliable, and a network latency in a home network is very small, or even may be ignored. Therefore, the third parameter values of the network latencies of these users may be basically considered to be network latencies under action of the network between the collection device and the connection location between the carrier network and the home network. Therefore, the third parameter values of the network latencies of these users are all distributed within a relatively small-value range when the network status of the carrier network is favorable. Whether a user accesses the carrier network wired or wirelessly using user equipment cannot be distinguished in a network. Therefore, in this embodiment of the present disclosure, a value of a lower quantile in the third parameter values of the network latencies may be selected as the baseline threshold. For example, a third parameter value ranking within 0 to 20% after the sorting is selected as the baseline threshold.

It should be noted that, after the baseline threshold is determined, the baseline threshold may be compared with a standard value that is of the network KPI parameter of the carrier network and that is set by an operator. If the network quality represented by the determined baseline threshold is lower than the network quality represented by the second threshold of the network KPI parameter of the carrier network, it may indicate that values of lower quantiles (for example, 20%) in the third parameter values of the network latencies corresponding to the plurality of users are still greater than the second threshold of the network latency in the carrier network. In this case, it indicates that network latencies of almost all of the plurality of users are greater than the second threshold of the network latency, and it may indicate that quality of the carrier network is relatively poor. The third parameter collected by the collection device is inapplicable to analysis of the quality of the home network.

In an optional implementation of this embodiment of the present disclosure, before step 101 is performed, the method may further include determining, based on customer experience indexes of the plurality of users within the preset time period and fourth parameter values of the network KPI parameters of the plurality of users within the preset time period in the home network, a mapping relationship between user experience parameters corresponding to the customer experience indexes and the network KPI parameters, and determining, based on the mapping relationship, the first threshold corresponding to the network KPI parameter in the home network.

If the preset time period includes a plurality of (for example, 100) sampling periods, there may be a plurality of (for example, 100) customer experience indexes of each user within the preset time period, and the customer experience indexes are customer experience indexes of the plurality of sampling periods within the preset time period.

The customer experience index of each user within the preset time period may be obtained from the collection device, or may be calculated based on customer experience index data collected by the collection device. For example, if the collection device collects a VMOS and a stalling time ratio of each sampling period, the VMOS that is of each sampling period and that is collected by the collection device may be directly used as the customer experience index. For another example, if the collection device collects playing duration and stalling duration of each sampling period, a ratio of the stalling duration of each sampling period to the playing duration of the sampling period may be used as a stalling time ratio of the sampling period.

In this embodiment of the present disclosure, the network KPI parameters of the plurality of users are network KPI parameters existing when the plurality of users access, using user equipment in the home network through the carrier network, a service provided by the provider network. The customer experience indexes of the plurality of users are customer experience indexes existing when the plurality of users access, using the user equipment in the home network through the carrier network, the service provided by the provider network. For example, the network KPI parameters of the plurality of users may be network KPI parameters existing when the plurality of users access an IPTV service using a STB, and the customer experience indexes of the plurality of users are customer experience indexes existing when the plurality of users access the IPTV service using the STB.

The user experience parameter may be used to represent user service experience quality. The network quality represented by the user experience parameter is usually consistent with the network quality represented by the customer experience index. Specifically, the user experience parameter corresponding to the customer experience index may be the customer experience index, or may be a parameter related to the customer experience index. For example, when the customer experience index is a VMOS, the user experience parameter is also a VMOS, and when the customer experience index is a video stalling time ratio, the user experience parameter may be a video stalling time ratio, or may be a video stalling user quantity ratio.

Before the quality of the home network is analyzed, the first threshold corresponding to the network KPI parameter in the home network may be alternatively determined first. The network quality represented by the user experience parameter is consistent with the network quality represented by the customer experience index. Therefore, the mapping relationship between the user experience parameter and the network KPI parameter may represent a mapping relationship between the customer experience index and the network KPI parameter. Therefore, in this embodiment of the present disclosure, the first threshold corresponding to the network KPI parameter in the home network may be determined based on the mapping relationship between the user experience parameter and the network KPI parameter, that is, it may be determined that the network KPI parameter in the home network can cause the experience quality represented by the customer experience index to be lower than a threshold of the experience quality represented by the customer experience index threshold.

When the network quality deteriorates, the parameter value of the network KPI parameter in the network changes. Consequently, the user experience parameter of the user changes, and user service experience quality also deteriorates. In other words, a network service of the user deteriorates. Therefore, there is a mapping relationship between the parameter value of the network KPI parameter and the user experience parameter. After the mapping relationship between the parameter value of the network KPI parameter and the user experience parameter is determined, a parameter value of the network KPI parameter that can cause the experience quality represented by the customer experience index to be lower than the experience quality represented by the customer experience index threshold may be determined. In other words, the parameter value is the first threshold of the network KPI parameter.

When the user experience parameter corresponding to the customer experience index is a customer experience index, the mapping relationship between the user experience parameter and the network KPI parameter may be directly determined based on customer experience indexes of a plurality of users within the preset time period and fourth parameter values of network KPI parameters of the plurality of users within the preset time period in the home network.

When the user experience parameter corresponding to the customer experience index is a customer experience index, a customer experience index corresponding to a parameter value of each network KPI parameter may be determined based on the parameter value of the network KPI parameter in the fourth parameter value of the network KPI parameter of each user. In this case, the customer experience index may be a statistical value of a user indicator corresponding to the parameter value of each network KPI parameter, for example, an average value or a median value. For example, the network KPI parameter is a network latency, and the fourth parameter values include 2 milliseconds (ms), 3 ms, 2 ms, 4 ms, 2 ms, and 5 ms. In this case, determining customer experience indexes corresponding to the parameter value of each network KPI parameter is respectively determining customer experience indexes corresponding to the parameter values 2 ms, 3 ms, 4 ms, and 5 ms. A customer experience index corresponding to a parameter value 2 may be a statistical value of customer experience indexes corresponding to three values of 2 ms in the fourth parameter values of the network KPI parameters. When the user experience parameter corresponding to the customer experience index is a customer experience index, the fourth parameter value of the network KPI parameter of each user may further be divided into network KPI parameter intervals, and a customer experience index corresponding to each network KPI parameter interval is determined based on the network KPI parameter interval obtained through division. In this case, the customer experience index may be a statistical value of the customer experience index corresponding to each network KPI parameter interval, for example, an average value, a median value, or a value of a customer experience index corresponding to a point in the network KPI parameter interval.

It should be noted that, in the foregoing process of determining the mapping relationship, when the user experience parameter is a VMOS, if a value that is of the user experience parameter and that corresponds to the parameter value of each network KPI parameter in the fourth parameter value of the network KPI parameter of each user is determined based on the parameter value of the network KPI parameter, the value that is of the user experience parameter and that corresponds to the parameter value of each network KPI parameter may be a statistical value, for example, an average value or a median value, of a VMOS value corresponding to the parameter value of the network KPI parameter, or if a value that is of the user experience parameter and that corresponds to each network KPI parameter interval is determined based on the network KPI parameter interval obtained through division, the value that is of the user experience parameter and that corresponds to the parameter value of each network KPI parameter may be a statistical value, for example, an average value, a median value, or a value that is of the user experience parameter and that corresponds to a point in the network KPI parameter interval, of a VMOS value corresponding to each network KPI parameter interval.

When the user experience parameter is a video stalling time ratio, if a value that is of the user experience parameter and that corresponds to the parameter value of each network KPI parameter in the fourth parameter value of the network KPI parameter of each user is determined based on the parameter value of the network KPI parameter, the value that is of the user experience parameter and that corresponds to the parameter value of each network KPI parameter may be a statistical value, for example, an average value or a median value, of a video stalling time ratio corresponding to the parameter value of the network KPI parameter, or if a value that is of the user experience parameter and that corresponds to each network KPI parameter interval is determined based on the network KPI parameter interval obtained through division, the value that is of the user experience parameter and that corresponds to the parameter value of each network KPI parameter may be a statistical value, for example, an average value, a median value, or a value that is of the user experience parameter and that corresponds to a point in the network KPI parameter interval, of a video stalling time ratio corresponding to each network KPI parameter interval.

When the user experience parameter corresponding to the customer experience index is not a customer experience index, a value that is of the user experience parameter and that corresponds to each parameter (for example, 2 ms in the foregoing example) in the fourth parameter value of the network KPI parameter of each user may be determined based on each parameter value in the fourth parameter value, or the fourth parameter value of the network KPI parameter of each user may be divided into network KPI parameter intervals, and a value that is of a user experience parameter and that corresponds to each network KPI parameter interval is determined based on the network KPI parameter interval obtained through division.

When the user experience parameter is a video stalling user quantity ratio, if a value that is of the user experience parameter and that corresponds to the parameter value of each network KPI parameter in the fourth parameter value of the network KPI parameter of each user is determined based on the parameter value of the network KPI parameter, the value that is of the user experience parameter and that corresponds to the parameter value of each network KPI parameter may be a video stalling user quantity ratio corresponding to the parameter value of the network KPI parameter, or if a value that is of the user experience parameter and that corresponds to each network KPI parameter interval is determined based on the network KPI parameter interval obtained through division, the value that is of the user experience parameter and that corresponds to the parameter value of each network KPI parameter may be a video stalling user quantity ratio corresponding to each network KPI parameter interval.

For example, the user experience parameter is a video stalling user quantity ratio. A video stalling user represents a user whose video stalls within the preset time period. After the user whose video stalls within the preset time period is obtained, a video stalling user quantity ratio corresponding to the parameter value of each network KPI parameter in the fourth parameter value of the network KPI parameter of each of the plurality of users may be calculated based on the fourth parameter value of the network KPI parameter of the user. A calculation manner is the video stalling user quantity ratio corresponding to the parameter value of each network KPI parameter equals a quantity of users whose videos stall in users corresponding to the parameter value of the network KPI parameter divided by a total user quantity corresponding to the parameter value of the network KPI parameter. In this way, after the video stalling user quantity ratio corresponding to the parameter value of each network KPI parameter is calculated, a mapping relationship between the video stalling user quantity ratio and the network KPI parameter may be obtained.

For example, the user experience parameter is a video stalling user quantity ratio, and the network KPI parameter is a network latency. A video stalling user represents a user whose video stalls within the preset time period. After the user whose video stalls within the preset time period is obtained, a video stalling user quantity ratio corresponding to a parameter value of each network latency in a fourth parameter value of a network latency of each of a plurality of users may be calculated based on the fourth parameter value of the network latency of the user. A calculation manner is the video stalling user quantity ratio corresponding to the parameter value of each network latency equals a quantity of users whose videos stall in users corresponding to the parameter value of the network latency divided by a total user quantity corresponding to the parameter value of the network latency. In this way, after the video stalling user quantity ratio corresponding to the parameter value of each network latency is calculated, a mapping relationship between the video stalling user quantity ratio and the network latency may be obtained. For example, when the parameter values included in the fourth parameter value of the network latency may be 0.55 ms, 1 ms, 1.1 ms, 1.53 ms, 1.8 ms, 2 ms, and 2.25 ms, a video stalling user quantity ratio corresponding to the parameter value included in the fourth parameter value of each network latency may be calculated, and further, a mapping relationship between the video stalling user quantity ratio and the network latency may be obtained.

For another example, fourth parameter values of network KPI parameters of a plurality of users within the preset time period in the home network may include a relatively large quantity of different parameter values. Therefore, in this embodiment of the present disclosure, the fourth parameter value may be further divided into intervals, to obtain at least two network KPI parameter intervals. Then, a user experience parameter corresponding to each network KPI parameter interval is calculated based on a customer experience index corresponding to a fourth parameter value of each of the at least two network KPI parameter intervals. Subsequently, for any network KPI parameter interval, a mapping relationship between a user experience parameter corresponding to the network KPI parameter interval and a target value of the network KPI parameter interval is determined. The target value of the network KPI parameter interval is greater than or equal to a left boundary of the network KPI parameter interval and is less than or equal to a right boundary of the network KPI parameter interval.

For example, the user experience parameter is a video stalling user quantity ratio. The fourth parameter value of the network KPI parameter is divided into at least two network KPI parameter intervals, and then a video stalling user quantity ratio corresponding to each of the at least two network KPI parameter intervals is calculated based on a customer experience index corresponding to a fourth parameter value of the network KPI parameter interval. A calculation manner may be the video stalling user quantity ratio corresponding to the network KPI parameter interval equals a quantity of users whose videos stall of users corresponding to the network KPI parameter interval divided by a total user quantity corresponding to the network KPI parameter interval. Then a mapping relationship between a video stalling user quantity ratio corresponding to each network KPI parameter interval and a target value of the network KPI parameter interval is determined. In other words, the determined mapping relationship is a mapping relationship between the user experience parameter and the network KPI parameter. The target value of each network KPI parameter interval is used to represent the network KPI parameter interval, and a value of the target value is greater than or equal to a left boundary of the network KPI parameter interval and is less than or equal to a right boundary of the network KPI parameter interval. Specifically, the target value may be an average value of corresponding network KPI parameters in the network KPI parameter interval, a median value of corresponding network KPI parameters in the network KPI parameter interval, a middle point of the network KPI parameter interval, an interval boundary value of the network KPI parameter interval, or the like.

For example, the user experience parameter is a video stalling user quantity ratio, and the network KPI parameter is a network latency. The fourth parameter value may be divided into intervals first. For example, parameter values included in the fourth parameter value of the network latency may be 0.55 ms, 1 ms, 1.1 ms, 1.53 ms, 1.8 ms, 2 ms, and 2.25 ms. These parameters include a relatively large quantity of parameter values with different values. In this case, the fourth parameter value may be divided into intervals first, and then a mapping relationship between the network KPI parameter and the user experience parameter is determined based on the fourth parameter that is divided into intervals and the customer experience index.

The parameter values included in the fourth parameter value of the network latency are used as an example, and a value range of the parameter values is 0.55 ms to 2.25 ms, and may be divided into two network KPI parameter intervals, where one interval is greater than or equal to 0.5 ms and less than 1.5 ms, and the other interval is greater than or equal to 1.5 ms and less than 2.5 ms. Then, a user experience parameter corresponding to each network KPI parameter interval may be determined, that is, a video stalling user quantity ratio corresponding to the network KPI parameter interval that is greater than or equal to 0.5 ms and less than 1.5 ms, and a video stalling user quantity ratio corresponding to the network KPI parameter interval that is greater than or equal to 1.5 ms and less than 2.5 ms may be determined. After the video stalling user quantity ratio corresponding to each network KPI parameter interval is determined, a mapping relationship between the video stalling user quantity ratio and a target value corresponding to the network KPI parameter interval may be determined based on the video stalling user quantity ratio corresponding to the network KPI parameter interval. That is, the mapping relationship is a mapping relationship between the user experience parameter and the network KPI parameter. The target value may be an average value of corresponding network KPI parameters in the network KPI parameter interval, a median value of corresponding network KPI parameters in the network KPI parameter interval, a middle point of the network KPI parameter interval, an interval boundary value of the network KPI parameter interval, or the like. For example, when it is obtained through calculation that the network KPI parameter interval is greater than or equal to 1.5 ms and less than 2.5 ms, the target value may be 2 ms or may be 1.5 ms.

When the first threshold corresponding to the network KPI parameter in the home network is determined based on the mapping relationship between the user experience parameter and the network KPI parameter, a parameter value that is of the network KPI parameter and that corresponds to a preset threshold of the user experience parameter may be determined based on the mapping relationship, and the parameter value that is of the network KPI parameter and that corresponds to the preset threshold of the user experience parameter is determined as the first threshold. The preset threshold may be a value of the user experience parameter existing when user experience quality represented by the user experience parameter can meet a user requirement. In other words, the preset threshold is a value of the user experience parameter existing when user experience quality can exactly meet a user requirement. If the user experience parameter is a customer experience index, the preset threshold that is of the user experience parameter and that is used to determine the first threshold may be the customer experience index threshold in step 101.

When the first threshold corresponding to the network KPI parameter in the home network is determined based on the mapping relationship between the user experience parameter and the network KPI parameter, an inflection point of the network KPI parameter may further be determined based on the mapping relationship, and the inflection point is used as the first threshold. A first parameter value changing trend between a user experience parameter corresponding to the inflection point and a maximum value in the user experience parameter is different from a second parameter value changing trend between the user experience parameter corresponding to the inflection point and a minimum value in the user experience parameter.

If a larger value of the user experience parameter indicates poorer network quality, the second changing trend is greater than the first changing trend. If a smaller value of the user experience parameter indicates poorer network quality, the second changing trend is less than the first changing trend.

It should be noted that, in the foregoing determining process of the first threshold, a function relationship between the network KPI parameter and the user experience parameter may further be fit based on the mapping relationship. The fit function relationship may basically reflect the mapping relationship. Therefore, after the function relationship is fit, a parameter value that is of the network KPI parameter and that corresponds to the preset threshold of the user experience parameter is then determined using the fit function relationship, or the inflection point of the network KPI parameter is determined using the fit function relationship, to further determine the first threshold.

Figure 4:
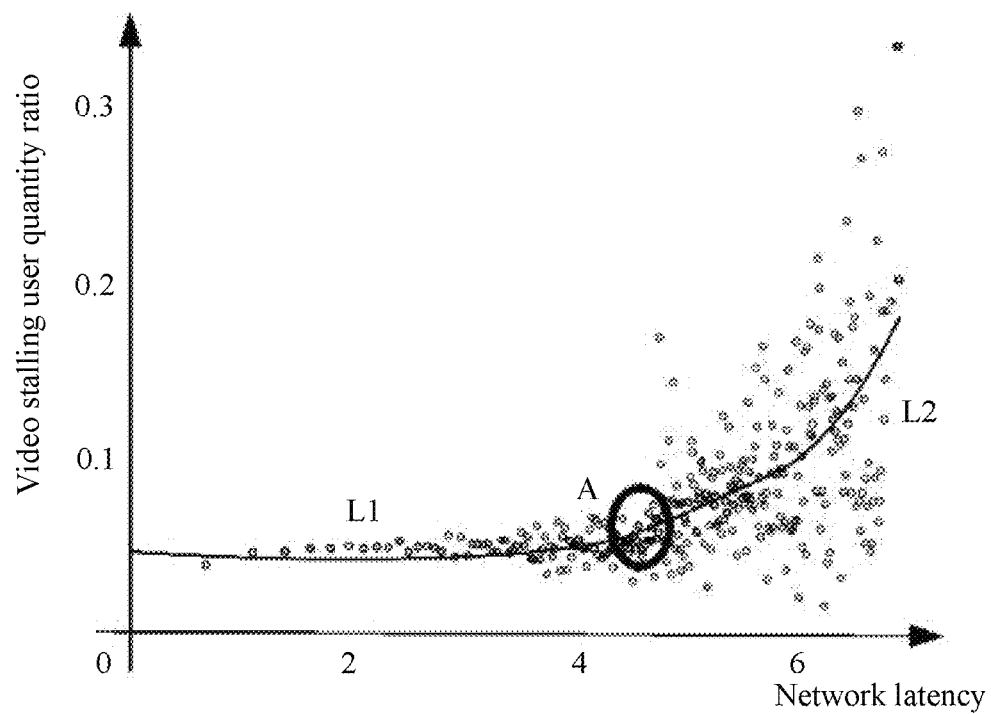
FIG. 4 is a schematic diagram of a mapping relationship between a video stalling user quantity ratio and a network latency according to an embodiment of the present disclosure.

For example, the user experience parameter is a video stalling user quantity ratio, the network KPI parameter is a network latency, and the inflection point of the network KPI parameter is determined as the first threshold using the fit function relationship. FIG. 4 shows a mapping relationship between the video stalling user quantity ratio and the network latency. In FIG. 4, a vertical coordinate is the video stalling user quantity ratio, and a horizontal coordinate is the network latency. As shown in FIG. 4, dots in the figure represent the mapping relationship between the video stalling user quantity ratio and the network KPI parameter, a curve in the figure represents the function relationship that is between the network KPI parameter and the user experience parameter and that is fit based on the mapping relationship, namely, a function relationship between the network latency and the video stalling user quantity ratio. It can be learned from a changing trend of the curve in the figure that, the changing trend of the curve changes at a circle A in the figure. The curve is divided into two parts L1 and L2 at the circle A. The part L1 of the curve changes moderately, it indicates that as the network latency increases, the video stalling user quantity ratio does not change greatly, it further indicates that as the network latency increases, user service experience quality deteriorates at a relatively low speed, and it may further indicate that network quality of the part L1 is in a relatively good state. The part L2 of the curve changes sharply, as the network latency increases, the video stalling user quantity ratio increases greatly, and it indicates that as the network latency increases, the video stalling user quantity ratio changes greatly, it further indicates that as the network latency increases, the network quality deteriorates at a relatively high speed, and it further indicates that as the network latency increases, the network quality deteriorates rapidly. Therefore, a changing trend of the part L1 of the curve is different from a changing trend of the part L2 of the curve. In other words, the circle A is used as an inflection point of the network latency, and a network latency corresponding to the circle A is a threshold representing that the network quality starts to deteriorate greatly, and may be determined as the first threshold.

In this embodiment of the present disclosure, before the mapping relationship between the user experience parameter and the network KPI parameter is determined, customer experience indexes of a plurality of users within the preset time period and fourth parameter values of network KPI parameters of the plurality of users within the preset time period in the home network may further be determined first.

A manner of determining the fourth parameter values of the network KPI parameters of the plurality of users within the preset time period in the home network may be determining a value obtained by subtracting the baseline threshold from the third parameter value of each of the plurality of users as the fourth parameter value of the user. The third parameter value of each of the plurality of users is a parameter value of a network KPI parameter in a network between user equipment used by the user and the collection device. After the baseline threshold is subtracted from the third parameter value, the fourth parameter value of each of the plurality of users may be obtained.

The method in the foregoing embodiment of the present disclosure may be performed by a data analysis device. Specifically, the data analysis device obtains data (for example, the first parameter value and customer experience index data of the target user, or the third parameter values and customer experience indexes of the plurality of users) collected by the collection device and performs the method in the foregoing embodiment. A specific implementation of obtaining, by the data analysis device, the data collected by the collection device is not limited in this embodiment of the present disclosure. For example, the collection device may periodically report the collected data to the data analysis device.

Figure 5:
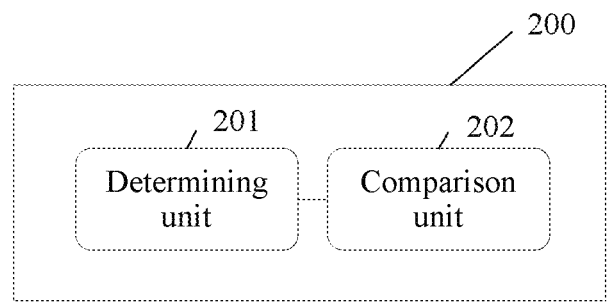
FIG. 5 is a schematic block diagram of a network quality determining apparatus according to an embodiment of the present disclosure.

FIG. 5 is a schematic block diagram of a network quality determining apparatus 200 according to an embodiment of the present disclosure. The determining apparatus 200 may be the foregoing data analysis device. As shown in FIG. 5, the apparatus 200 includes a determining unit 201 configured to when experience quality represented by a customer experience index of a target user within a first time period is lower than experience quality represented by a customer experience index threshold, determine, using a first parameter value that is of a network KPI parameter of the target user within a second time period and that is collected by a collection device in a carrier network, a second parameter value of the network KPI parameter of the target user within the second time period in a home network, where the customer experience index is used to represent service experience of the target user, the network KPI parameter is used to represent network quality, and the second time period includes the first time period, and a comparison unit 202 configured to compare network quality represented by the second parameter value of the network KPI parameter with network quality represented by a first threshold corresponding to the network KPI parameter in the home network, where the determining unit 201 is further configured to when the network quality represented by the second parameter value of the network KPI parameter is lower than the network quality represented by the first threshold, determine that network quality of the home network is poor.

In this embodiment of the present disclosure, when a network service quality parameter of the target user does not satisfy a standard value within the first time period, the apparatus 200 may collect, using the carrier network, a first parameter value of at least one network KPI parameter of a target network corresponding to the target user within the second time period. When users run services, data transmitted between the users and a service provider network all passes through the carrier network. Therefore, the first parameter value may be directly collected from the carrier network such that probes do not need to be deployed in devices of the network, thereby avoiding a problem that a network causing user video experience deterioration cannot be determined because it is difficult to deploy a probe and network quality cannot be accurately analyzed. In addition, in this embodiment of the present disclosure, a threshold that is in the target network and that corresponds to the at least one network KPI parameter is predetermined. Therefore, whether quality of the target network is poor may be determined by determining whether the first parameter value of the at least one network KPI parameter satisfies the threshold that is in the target network and that corresponds to the at least one network KPI parameter such that a reason for deterioration of the network service quality of the target user can be further determined.

It may be understood that, when determining, using the first parameter value that is of the KPI parameter of the target user within the second time period and that is collected by the collection device in the carrier network, the second parameter value of the network KPI parameter of the target user within the second time period in the home network, the determining unit 201 is further configured to determine the second parameter value based on the first parameter value and a baseline threshold of the network KPI parameter, where the baseline threshold is used to represent network quality of a network between the collection device and a connection location between the carrier network and the home network, and the network quality represented by the baseline threshold is higher than network quality represented by a second threshold of the network KPI parameter in the carrier network.

It may be understood that, the determining unit 201 is further configured to determine the baseline threshold based on third parameter values that are of network KPI parameters of a plurality of users within a preset time period and that are collected by the collection device, where the third parameter value of each of the plurality of users is a parameter value of the network KPI parameter in a network between user equipment used by the user and the collection device.

It may be understood that, when determining the baseline threshold based on the third parameter values that are of the network KPI parameters of the plurality of users within the preset time period and that are collected by the collection device, the determining unit 201 is further configured to sort the third parameter values in ascending order of the third parameter values, and determine a third parameter value that is at a preset location after the sorting as the baseline threshold, or determine a statistical value of a third parameter value that is before a preset location after the sorting as the baseline threshold, where the preset location is a location within top 50% in the sorting order of the third parameter values.

It may be understood that, the determining unit 201 is further configured to determine, based on customer experience indexes of the plurality of users within the preset time period and fourth parameter values of the network KPI parameters of the plurality of users within the preset time period in the home network, a mapping relationship between user experience parameters corresponding to the customer experience indexes and the network KPI parameters, where the user experience parameter is used to represent user service experience quality, and determine, based on the mapping relationship, the first threshold corresponding to the network KPI parameter in the home network.

It may be understood that, when determining, based on the customer experience indexes of the plurality of users within the preset time period and the fourth parameter values of the network KPI parameters of the plurality of users within the preset time period in the home network, the mapping relationship between the user experience parameters corresponding to the customer experience indexes and the network KPI parameters, the determining unit 201 is further configured to divide the fourth parameter value into at least two network KPI parameter intervals, calculate, based on the customer experience index corresponding to the fourth parameter value of each of the at least two network KPI parameter intervals, a user experience parameter corresponding to the network KPI parameter interval, and for any network KPI parameter interval, determine a mapping relationship between a user experience parameter corresponding to the network KPI parameter interval and a target value of the network KPI parameter interval, where the target value of the network KPI parameter interval is greater than or equal to a left boundary of the network KPI parameter interval and is less than or equal to a right boundary of the network KPI parameter interval.

It may be understood that, when determining, based on the mapping relationship, the first threshold corresponding to the network KPI parameter in the home network, the determining unit 201 is further configured to determine an inflection point of the network KPI parameter as the first threshold based on the mapping relationship, where a parameter value changing trend between a user experience parameter corresponding to the inflection point and a maximum value in the user experience parameter is different from a parameter value changing trend between the user experience parameter corresponding to the inflection point and a minimum value in the user experience parameter, or determine a parameter value of the network KPI parameter corresponding to a preset threshold of the user experience parameter based on the mapping relationship, where the preset threshold is a value of the user experience parameter when user experience quality represented by the user experience parameter meets a user requirement, and determine the parameter value of the network KPI parameter corresponding to the preset threshold as the first threshold.

It may be understood that, the determining unit 201 is further configured to determine a value obtained by subtracting the baseline threshold from the third parameter value of each of the plurality of users as the fourth parameter value of the user.

It may be understood that, when the customer experience index is a VMOS, the user experience parameter is a VMOS.

It may be understood that, when the customer experience index is a video stalling time ratio, the user experience parameter is a video stalling time ratio or a video stalling user quantity ratio.

It may be understood that, the first parameter value includes parameter values of a plurality of sampling periods within the second time period, the determined second parameter value is a statistical value of differences between parameter values included in the first parameter value and the baseline threshold, and the comparison unit 202 is further configured to compare the network quality represented by the second parameter value with the network quality represented by the first threshold by comparing the second parameter value of the network KPI parameter with the first threshold, or each parameter value included in the second parameter value is a difference between each parameter value included in the first parameter value and the baseline threshold, and the comparison unit 202 is further configured to compare the network quality represented by the second parameter value with the network quality represented by the first threshold by comparing a quantity of times for which network quality represented by parameter values in the second parameter value within the second time period is lower than the network quality represented by the first threshold with a preset standard quantity of times.

It may be understood that, the statistical value of the differences between the parameter values included in the first parameter value and the baseline threshold includes an average value of the differences between the parameter values included in the first parameter value and the baseline threshold, an upper edge value of a boxplot corresponding to the differences between the parameter values included in the first parameter value and the baseline threshold, or a value of a preset quantile corresponding to the differences between the parameter values included in the first parameter value and the baseline threshold.

It may be understood that, the customer experience index includes the video stalling time ratio and/or the VMOS, and the network KPI parameter includes a network latency and/or a network packet loss rate.

It may be understood that, the plurality of users belong to a carrier network in which the target user is located or belongs to an OLT to which the target user belongs.

It may be understood that, the collection device is disposed on a core router of the carrier network, or the collection device is deployed on a core router of the carrier network in bypass mode.

It may be understood that, the second time period further includes a third time period before the first time period.

The network quality determining apparatus 200 according to this embodiment of the present disclosure may correspond to an execution body in the network quality determining method according to the embodiments of the present disclosure, and the modules in the network quality determining apparatus 200 and other operations and/or functions are separately used to implement procedures corresponding to the methods in FIG. 2. For brevity, details are not described herein again.

Figure 6:
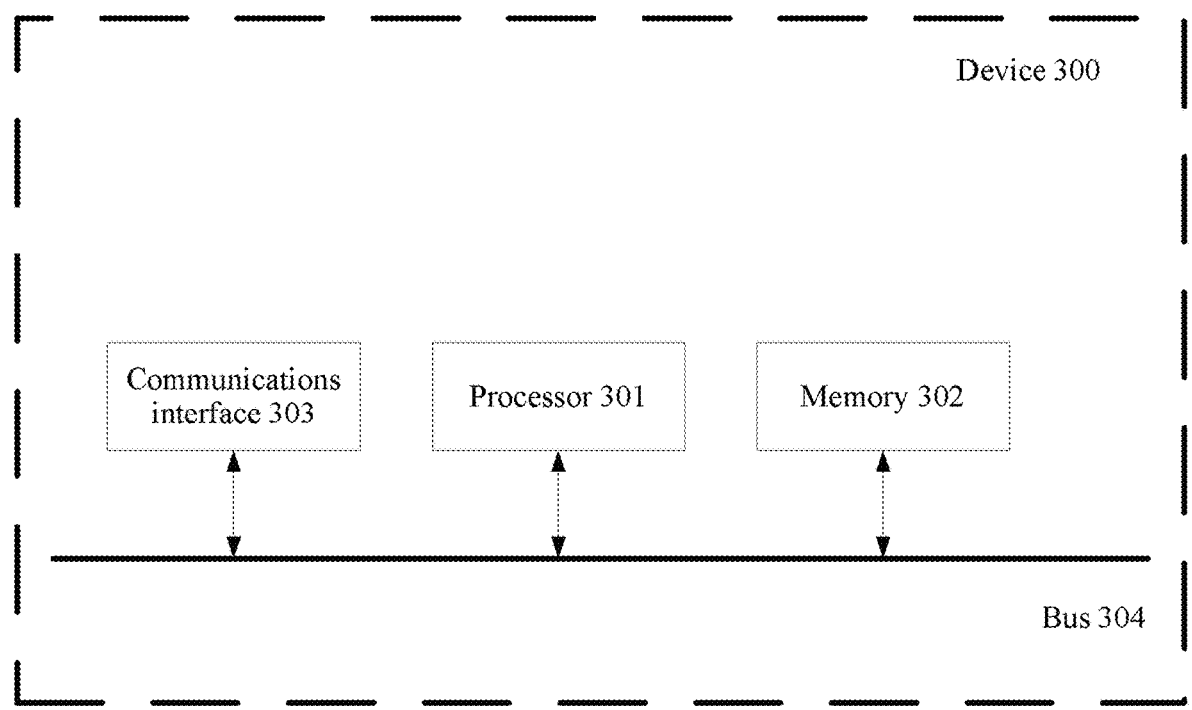
FIG. 6 is a schematic block diagram of a network quality determining device according to an embodiment of the present disclosure.

FIG. 6 is a schematic block diagram of a network quality determining device 300 according to an embodiment of the present disclosure. The determining device 300 may be the foregoing data analysis device. As shown in FIG. 6, the device 300 includes a processor 301, a memory 302, and a communications interface 303. The memory 302 is configured to store executable program code. The processor 301 runs a program corresponding to the executable program code by reading the executable program code stored in the memory 302. The communications interface 303 is configured to communicate with an external device. The device 300 may further include a bus 304. The bus 304 is configured to connect the processor 301, the memory 302, and the communications interface 303 such that the processor 301, the memory 302, and the communications interface 303 communicate with one another using the bus 304.

The network quality determining device 300 according to this embodiment of the present disclosure may correspond to an execution body in the network quality determining method according to the embodiments of the present disclosure, and the modules in the network quality determining device 300 and other operations and/or functions are separately used to implement procedures corresponding to the methods in FIG. 2. For brevity, details are not described herein again.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

What is claimed is:

1. A collection device configured to operate in a carrier network, the collection device comprising:
    a non-transitory computer readable medium configured to store computer-executable instructions; and
    a processor coupled to the non-transitory computer readable medium and configured to execute the computer-executable instructions to cause the collection device to:
        establish a communication connection between a service provider network and a home network;
        measure stalling durations and playing durations for communications between the service provider network and the home network through the communication connection for a plurality of sampling periods;
        add the stalling durations to produce a first sum of the stalling durations;
        add the playing durations to produce a second sum of the playing durations;
        calculate a customer experience index of a target user as a ratio of the first sum of the stalling durations to the second sum of the playing durations;
        collect, in the carrier network, a first parameter value of a network key performance indicator (KPI) parameter of the target user in the home network when a first experience quality represented by the customer experience index of the target user within a first time period is lower than a second experience quality represented by a customer experience index threshold, wherein the customer experience index represents user experience quality, and wherein the network KPI parameter represents network quality;
        determine a baseline threshold based on third parameter values that are of network KPI parameters of a plurality of users within a preset time period and that are collected by the collection device, wherein the third parameter value of each of the plurality of users is a parameter value of the network KPI parameter in a network between user equipment used by the target user and the collection device;
        determine, using the first parameter value, a second parameter value of the network KPI parameter of the target user within a second time period in the home network by determining the second parameter value based on the first parameter value and the baseline threshold of the network KPI parameter, wherein the baseline threshold represents network quality of a network between the collection device and a connection location between the carrier network and the home network, and wherein the network quality represented by the baseline threshold is higher than network quality represented by a second threshold of the network KPI parameter in the carrier network;
        compare a first network quality represented by the second parameter value of the network KPI parameter with a second network quality represented by a first threshold corresponding to the network KPI parameter in the home network; and
        determine that quality of the home network is poor when the first network quality represented by the second parameter value of the network KPI parameter is lower than the second network quality represented by the first threshold.

2. The collection device of claim 1, wherein the processor is configured to execute the computer-executable instructions to cause the collection device to determine the baseline threshold based on the third parameter values that are of the network KPI parameters of the plurality of users within the preset time period and that are collected by the collection device comprises the processor being configured to execute the computer-executable instructions to cause the collection device to:
    sort the third parameter values in ascending order of the third parameter values; and
    determine a third parameter value that is at a preset location after the sorting as the baseline threshold, wherein the preset location is a location within a top 50% in the sorting order of the third parameter values.

3. The collection device of claim 1, wherein the processor is configured to execute the computer-executable instructions to cause the collection device to determine the baseline threshold based on the third parameter values that are of the network KPI parameters of the plurality of users within the preset time period and that are collected by the collection device comprises the processor being configured to execute the computer-executable instructions to cause the collection device to:
  sort the third parameter values in ascending order of the third parameter values; and
  determine a statistical value of a third parameter value that is before a preset location after the sorting as the baseline threshold, wherein the preset location is a location within a top 50% in the sorting order of the third parameter values.

4. The collection device of claim 1, wherein before determining the second parameter value, the processor is further configured to execute the computer-executable instructions to cause the collection device to:
  determine, based on customer experience indexes of the plurality of users within the preset time period and fourth parameter values of the network KPI parameters of the plurality of users within the preset time period in the home network, a mapping relationship between user experience parameters corresponding to the customer experience indexes and the network KPI parameters, wherein the user experience parameter is used to represent user service experience quality; and
  determine, based on the mapping relationship, the first threshold corresponding to the network KPI parameter in the home network.

5. The collection device of claim 4, wherein the processor is configured to execute the computer-executable instructions to cause the collection device to determine, based on the customer experience indexes of the plurality of users within the preset time period and fourth parameter values of the network KPI parameters of the plurality of users within the preset time period in the home network, the mapping relationship between the user experience parameters corresponding to the customer experience indexes and the network KPI parameters comprises the processor being configured to execute the computer-executable instructions to cause the collection device to:
  divide the fourth parameter value into at least two network KPI parameter intervals;
  calculate, based on the customer experience index corresponding to the fourth parameter value of each of the at least two network KPI parameter intervals, a user experience parameter corresponding to the network KPI parameter interval; and
  for any network KPI parameter interval, determine a mapping relationship between a user experience parameter corresponding to the network KPI parameter interval and a target value of the network KPI parameter interval, wherein the target value of the network KPI parameter interval is greater than or equal to a left boundary of the network KPI parameter interval and is less than or equal to a right boundary of the network KPI parameter interval.

6. The collection device of claim 4, wherein the processor is configured to execute the computer-executable instructions to cause the collection device to determine, based on the mapping relationship, the first threshold corresponding to the network KPI parameter in the home network comprises the processor being configured to execute the computer-executable instructions to cause the collection device to determine an inflection point of the network KPI parameter as the first threshold based on the mapping relationship, and wherein a parameter value changing trend between a user experience parameter corresponding to the inflection point and a maximum value in the user experience parameter is different from a parameter value changing trend between the user experience parameter corresponding to the inflection point and a minimum value in the user experience parameter.

7. The collection device of claim 4, wherein the processor is configured to execute the computer-executable instructions to cause the collection device to determine, based on the mapping relationship, the first threshold corresponding to the network KPI parameter in the home network comprises the processor being configured to execute the computer-executable instructions to cause the collection device to:
  determine a parameter value of the network KPI parameter corresponding to a preset threshold of the user experience parameter based on the mapping relationship, wherein the preset threshold is a value of the user experience parameter when user experience quality represented by the user experience parameter meets a user requirement; and
  determine the parameter value of the network KPI parameter corresponding to the preset threshold as the first threshold.

8. The collection device of claim 4, wherein before determining, based on the customer experience indexes of the plurality of users within the preset time period and the fourth parameter values of the network KPI parameters of the plurality of users within the preset time period in the home network, the mapping relationship between the user experience parameters corresponding to the customer experience indexes and the network KPI parameters, the processor is further configured to execute the computer-executable instructions to cause the collection device to determine a value obtained by subtracting the baseline threshold from the third parameter value of each of the plurality of users as the fourth parameter value of the target user.

9. The collection device of claim 4, wherein when the customer experience index is a first video stalling time ratio, the user experience parameter is a second video stalling time ratio or a video stalling user quantity ratio.

10. The collection device of claim 1, wherein the customer experience index comprises a video stalling time ratio and/or a video mean opinion score (VMOS), and wherein the network KPI parameter comprises a network latency and/or a network packet loss rate.

11. The collection device of claim 1, wherein a plurality of users belongs to the carrier network in which the target user is located or belongs to an optical line terminal (OLT) to which the target user belongs.

12. The collection device of claim 1, wherein the collection device is disposed on a first core router of the carrier network, or wherein the collection device is deployed on a second core router of the carrier network in bypass mode.

13. The collection device of claim 1, wherein the second time period further comprises a third time period before the first time period.

14. A collection device configured to operate in a carrier network, the collection device comprising:
  a non-transitory computer readable medium configured to store computer-executable instructions; and a processor coupled to the non-transitory computer readable medium and configured to execute the computer-executable instructions to cause the collection device to:
  establish a communication connection between a service provider network and a home network;
  measure stalling durations and playing durations for communications between the service provider network and the home network through the communication connection for a plurality of sampling periods;
  add the stalling durations to produce a first sum of the stalling durations;
  add the playing durations to produce a second sum of the playing durations;
  calculate a customer experience index of a target user as a ratio of the first sum of the stalling durations to the second sum of the playing durations;
  collect, in the carrier network, a first parameter value of a network key performance indicator (KPI) parameter of the target user in the home network when a first experience quality represented by the customer experience index of the target user within a first time period is lower than a second experience quality represented by a customer experience index threshold, wherein the customer experience index represents user experience quality, and wherein the network KPI parameter represents network quality;
  determine, using the first parameter value, a second parameter value of the network KPI parameter of the target user within a second time period in the home network by determining the second parameter value based on the first parameter value and a baseline threshold of the network KPI parameter, wherein the baseline threshold represents network quality of a network between the collection device and a connection location between the carrier network and the home network, wherein the network quality represented by the baseline threshold is higher than network quality represented by a second threshold of the network KPI parameter in the carrier network, wherein the first parameter value comprises parameter values of a plurality of sampling periods within the second time period, wherein the second parameter value is a statistical value of differences between parameter values comprised in the first parameter value and the baseline threshold, and wherein the statistical value of the differences between the parameter values comprised in the first parameter value and the baseline threshold comprises an average value of the differences between the parameter values comprised in the first parameter value and the baseline threshold, an upper edge value of a boxplot corresponding to the differences between the parameter values comprised in the first parameter value and the baseline threshold, or a value of a preset quantile corresponding to the differences between the parameter values comprised in the first parameter value and the baseline threshold;
  compare a first network quality represented by the second parameter value of the network KPI parameter with a second network quality represented by a first threshold corresponding to the network KPI parameter in the home network by comparing the first network quality represented by the second parameter value with the second network quality represented by the first threshold by comparing the second parameter value of the network KPI parameter with the first threshold; and
  determine that quality of the home network is poor when the first network quality represented by the second parameter value of the network KPI parameter is lower than the second network quality represented by the first threshold.

15. A collection device configured to operate in a carrier network, the collection device comprising:
  a non-transitory computer readable medium configured to store computer-executable instructions; and
  a processor coupled to the non-transitory computer readable medium and configured to execute the computer-executable instructions to cause the collection device to:
    establish a communication connection between a service provider network and a home network;
    measure stalling durations and playing durations for communications between the service provider network and the home network through the communication connection for a plurality of sampling periods;
    add the stalling durations to produce a first sum of the stalling durations;
    add the playing durations to produce a second sum of the playing durations;
    calculate a customer experience index of a target user as a ratio of the first sum of the stalling durations to the second sum of the playing durations;
    collect, in the carrier network, a first parameter value of a network key performance indicator (KPI) parameter of the target user in the home network when a first experience quality represented by the customer experience index of the target user within a first time period is lower than a second experience quality represented by a customer experience index threshold, wherein the customer experience index represents user experience quality, and wherein the network KPI parameter represents network quality;
    determine, using the first parameter value, a second parameter value of the network KPI parameter of the target user within a second time period in the home network by determining the second parameter value based on the first parameter value and a baseline threshold of the network KPI parameter, wherein the baseline threshold represents network quality of a network between the collection device and a connection location between the carrier network and the home network, wherein the network quality represented by the baseline threshold is higher than network quality represented by a second threshold of the network KPI parameter in the carrier network, wherein the first parameter value comprises parameter values of a plurality of sampling periods within the second time period, wherein the second parameter value comprises a plurality of parameter values, and wherein each parameter value comprised in the second parameter value is a difference between each parameter value comprised in the first parameter value and the baseline threshold;
    compare a first network quality represented by the second parameter value of the network KPI parameter with a second network quality represented by a first threshold corresponding to the network KPI parameter in the home network by comparing a quantity of times for which network quality represented by parameter values in the second parameter value within the second time period is lower than the network quality represented by the first threshold with a preset standard quantity of times; and determine that quality of the home network is poor when the first network quality represented by the second parameter value of the network KPI parameter is lower than the second network quality represented by the first threshold.

16. The collection device of claim 15, wherein the customer experience index comprises a video stalling time ratio and/or a video mean opinion score (VMOS), and wherein the network KPI parameter comprises a network latency and/or a network packet loss rate.

17. The collection device of claim 15, wherein a plurality of users belongs to the carrier network in which the target user is located or belongs to an optical line terminal (OLT) to which the target user belongs.

18. The collection device of claim 15, wherein the collection device is disposed on a first core router of the carrier network, or wherein the collection device is deployed on a second core router of the carrier network in bypass mode.

19. The collection device of claim 15, wherein the second time period further comprises a third time period before the first time period.

20. The collection device of claim 15, wherein the processor is further configured to execute the computer-executable instructions to cause the collection device to:

establish communication connections between the service provider network and a plurality of other home networks; and determine whether quality of each of the home networks is poor without deploying probes to each of the home networks.

* * * * *